(12) United States Patent
Ramesh et al.

(10) Patent No.: US 10,277,469 B2
(45) Date of Patent: *Apr. 30, 2019

(54) METHOD AND SYSTEM FOR A WIDE-BANDWIDTH, ON-PREMISES NETWORK

(71) Applicant: Maxlinear, Inc., Carlsbad, CA (US)

(72) Inventors: Sridhar Ramesh, Carlsbad, CA (US); Timothy Leo Gallagher, Carlsbad, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,530

(22) Filed: Jan. 31, 2017

(65) Prior Publication Data

US 2017/0141965 A1    May 18, 2017

Related U.S. Application Data

(63) Continuation of application No. 13/851,563, filed on Mar. 27, 2013, now Pat. No. 9,559,983.

(60) Provisional application No. 61/616,466, filed on Mar. 28, 2012.

(51) Int. Cl.
*H04L 12/24* (2006.01)
*H04L 12/46* (2006.01)
*H04L 12/28* (2006.01)
*H04L 12/26* (2006.01)

(52) U.S. Cl.
CPC .......... *H04L 41/12* (2013.01); *H04L 12/2801* (2013.01); *H04L 12/4633* (2013.01); *H04L 43/0811* (2013.01)

(58) Field of Classification Search
CPC ..... H04L 12/10; H04L 12/2836; H04L 12/66; H04L 12/2838; H04M 7/1215
See application file for complete search history.

(56) References Cited

U.S. PATENT DOCUMENTS

| 9,825,772 B2* | 11/2017 | Brooks ............... H04L 12/2801 |
| 2008/0120667 A1 | 5/2008 | Zaltsman |
| 2010/0027411 A1 | 2/2010 | Weber et al. |
| 2010/0125877 A1* | 5/2010 | Wells .................. H04L 12/2801 725/78 |

(Continued)

*Primary Examiner* — Yee F Lam
(74) *Attorney, Agent, or Firm* — McAndrews, Held & Malloy

(57) ABSTRACT

A network device comprising: a first connector for connecting to an external network from which data may be communicated using a first frequency band in accordance with a first communications protocol; a second connector for connecting to an on-premises network; and circuitry residing in a signal path between said first connector and said second connector. The circuitry may be operable to: permit a first portion of the first frequency band to pass from the first connector to the second connector; block a second portion of said first frequency band from passing from the first connector to the second connector; and communicate, via the second connector, signals that are normally communicated in frequency ranges not including the first frequency band, into the on-premises network using the first frequency band. The signals may include packets formatted in accordance with Multimedia over Coax Alliance (MoCA) standards.

20 Claims, 8 Drawing Sheets

(56) References Cited

U.S. PATENT DOCUMENTS

| | | | |
|---|---|---|---|
| 2010/0162340 A1* | 6/2010 | Riggsby | H04B 3/04 725/127 |
| 2011/0002245 A1* | 1/2011 | Wall | H04L 12/10 370/297 |
| 2011/0255452 A1* | 10/2011 | Brooks | H04L 12/2801 370/297 |
| 2011/0271313 A1* | 11/2011 | Urban | H04L 12/2861 725/109 |
| 2011/0277001 A1 | 11/2011 | Kaluskar et al. | |
| 2012/0054807 A1* | 3/2012 | Yoshioka | H04L 12/2801 725/85 |
| 2012/0106964 A1 | 5/2012 | Sniezko | |
| 2013/0091267 A1* | 4/2013 | Urban | H04L 12/2801 709/224 |
| 2015/0207525 A1* | 7/2015 | Li | H04N 21/6118 370/297 |

* cited by examiner

METHOD AND SYSTEM FOR A WIDE-BANDWIDTH, ON-PREMISES NETWORK

CLAIM OF PRIORITY

This patent application is a continuation of U.S. patent application Ser. No. 13/851,563 filed on Mar. 27, 2013, which makes reference to, claims priority to and claims benefit from U.S. Provisional Patent Application Ser. No. 61/616,466, titled "Method and System for a Wide-Bandwidth On-Premises Network" and filed on Mar. 28, 2012.

Each of the above-identified applications is hereby incorporated herein by reference in its entirety.

FIELD OF THE INVENTION

Certain embodiments of the invention relate to communication networks. More specifically, certain embodiments of the invention relate to a method and system for a wide bandwidth on-premises network.

BACKGROUND OF THE INVENTION

Existing networks are often inflexible and present compatibility issues when multiple standards are to be used in a single network. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a wide bandwidth on-premises network (e.g., a Multimedia over Coaxial Alliance (MoCA) network), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1A:
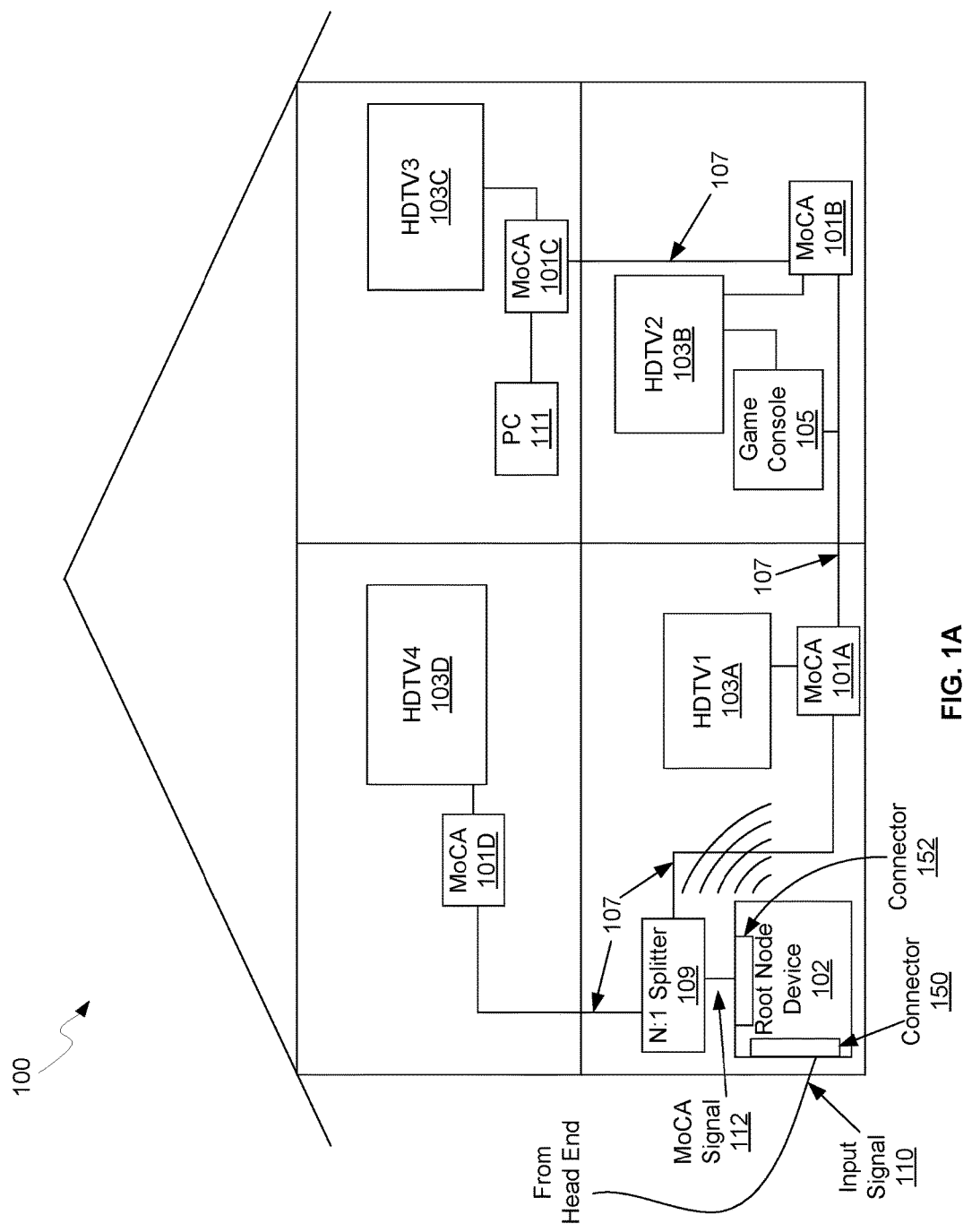
FIG. 1A is a diagram illustrating an example on-premises network, in accordance with an embodiment of the invention.

FIG. 1A is a diagram illustrating an example on-premises network, in accordance with an embodiment of the invention. Referring to FIG. 1A, there is shown an on-premises wired network 100 (e.g., an in-home, or in-office, local area network (LAN) that uses MoCA, IEEE 802.3, and/or the like) spanning a plurality of rooms in the premises, where each one may have one or more networked devices. There is also shown Multimedia over Cable Alliance (MoCA) devices 101A-101D, a root node device 102, high-definition televisions (HDTVs) 103A-103D, a game console 105, an N:1 splitter 109 (N being an integer), a personal computer 111, cables 107 (e.g., coaxial), and an input signal 110 of a network that is external to the premises. The input signal 110 may be provided by a cable head-end, a fiber-to-the-home service, digital subscriber line (DSL) service, or a satellite (e.g., a direct broadcast satellite (DBS) "dish") signal source, for example.

The MoCA devices 101A-101D are, for example, downstream from the root node 102 in the network 100 (e.g., "downstream" meaning from the external network to the root node 102 via the connector 150 and from the root node 102 toward the leaf nodes of the premises-based wired network via the connector 152; "upstream" meaning from the leaf nodes of the premises-based wired network toward the root note device 102 via the connector 152, and from the root node 102 toward the head end outside of the premises via the connector 150). Though only a single N:1 splitter 109 is illustrated in FIG. 1A, the network 100 may, for example, comprise a plurality of splitters in the home downstream from the root node device 102.

The MoCA devices 101A-101D (or general MoCA devices) may comprise network devices that enable a secure network 100 utilizing the cables 107. Each of the MoCA devices 101A-101D may, for example, be a stand-alone apparatus or may be incorporated in another device (e.g., television, personal video recorder (PVR), set-top box (STB), personal computer (PC), network attached storage (NAS) device, and/or the like). The MoCA devices 101A-101D may operate under any version of (e.g, 1.x, 2.x, etc.) of the MoCA standard, for example. The MoCA devices 101A-101D may, for example, communicate signals between devices in the ~1-2 GHz frequency range when operating with a cable TV signal, and in the ~400-900 MHz frequency range when operating with a satellite TV signal. These frequencies are only examples-the devices 101A-101D may be operable to handle different frequency ranges and/or configurable to handle multiple frequency ranges (e.g., configured to handle particular range(s) of frequencies based on the location in which the network 100 operates and/or based on the version of a networking standard that the network 100 is to be compatible with). In an example embodiment of the invention, the MoCA devices 101A-101D may receive MoCA signals from the root node device 102 in any frequency range supported by the cables 107. Other communication protocols may be utilized on the same cables 107.

The root node device 102 may operate as a network controller in the wired network, coordinating the wired network 100 communications. For example, the root node device 102 may operate as a MoCA network controller (e.g., may comprise a MoCA network controller system-on-chip (SoC)). The root node device 102 may also comprise some wireless capability and as such may configure wireless network communications via a wireless network protocol, such as 802.11x (i.e., any one or more of 802.11a, 802.11b, 802.11g, 802.11n, 802.11ac, etc.). The root node 102 may receive signals from a head end via connector 150, and accordingly may be operable to receive cable, satellite, digital subscriber line (DSL), fiber optic, or other communications protocols utilized by service providers to provide services to the premises.

In an example embodiment, the root node device 102 may comprise one or more bridges for converting the received signals to a MoCA signal, and therefore, the signals communicated between the root node 102 and the network 100 via the connector 152 may comprise MoCA signals only, so that the root node device 102 may utilize the entire spectrum supported by the cables 107 when communicating with the MoCA devices 101A-101D, the HDTVS 103A-103D, the game console 105, and/or the PC 111. In another example embodiment, one or more first portions of the signal 110 present at the connector 150 may be filtered out by the root node 102 such that those portions of the signal 110 are not present at the connector 152, and one or more second portions of the signal 110 present at the connector 150 may be passed (e.g., after some filtering and/or other processing) to the connector 152. In such an embodiment, a first portion of the frequency spectrum on the cable 107 may comprise MoCA signals and a second portion of the frequency band on the cable 107 may comprise signals of the standard/protocol of the signal 110 (e.g., cable or satellite or DSL), where the first portion is larger than is conventionally available for MoCA.

In another example embodiment, one or more of the MoCA devices 101A-101D may also operate as a network controller in the network 100, coordinating communications on the network 100 as per the MoCA standard, for example. In such an embodiment, one of the MoCA devices 101A-101D may operate as a backup MoCA network controller. In another example embodiment, one or more of the MoCA devices 101A-101D may be operable to provide a WLAN network.

Cable television signals, including data over cable service interface specification (DOCSIS) signals, may be communicated in the ~50 MHz to ~1 GHz range, for example. In the U.S., for example, the cable range generally has about 150 6-MHz TV channels, some of which are allocated to DOCSIS, some to digital television, and some to analog television. DOCSIS based communication may, for example, be used to provide Internet access to the network 100.

The MoCA devices 101A-101D may be operable to provide wireless network access to devices within the premises. Example wireless networks may comprise wireless local area networks (WLANs) that conform to an IEEE 802.11 (e.g., a, b, g, n, and ac) protocol, cellular (e.g., LTE), Bluetooth, ZigBee networks, and/or any other suitable standardized or proprietary protocol.

Under the MoCA standard, orthogonal frequency-division multiple access (OFDM) enables multiple nodes to simultaneously transmit physical layer (PHY) frames, each utilizing only a subset of subcarriers. The network controller pre-allocates the OFDM subcarrier subset to nodes on a mutually exclusive basis, with each OFDM PHY frame containing reservation requests destined solely for the network controller. The requesting nodes are to synchronize their subcarriers to those of the network controller, adjust their transmissions to ensure simultaneous time-of-arrival at the network controller, and adjust the amplitude of their transmissions as specified by the network controller. If these elements are met, the network controller receives a PHY frame with a payload bitstream that is demultiplexed to recover and forward-error-correction (FEC)-decode each individually transmitted reservation request.

In an example embodiment of the invention, in a network architecture that comprises a full-band D3/Video SoC, the root node device 102 may be operable to isolate the on-premises wired network 100 from the external network (the network via which signal 110 is communicated) by residing before, rather than after, the N:1 splitter 109. In this manner, only MoCA signals may be communicated over the on-premises wired network 100 and, thus, reduce or eliminate interference between different communication standards, since the root node device 102 may coordinate the frequency of all signals being communicated over the cables 107. For example, the root node 102 may receive cable television signals, which may be, for example, in the ~50 MHz-~1 GHz range, recover data from the cable signals and encapsulate the data in MoCA packets and communicate the resulting MoCA packets using any frequency within the available spectrum supported by the cables 107 (which may depend, for example, on the length of the cable 107). This frees up the cable frequency band inside the home for MoCA transmission. In other words, there may be no frequency spectrum inside the home that is specifically set aside for cable transmission (or satellite or whatever standard/protocol is used on the exterior network via which the signal 110 is received).

In an example embodiment of the invention, in a network architecture that comprises a full-band D3/Video SoC, the root node device 102 may be operable to isolate the on-premises network 100 from the outside network (on which signal 110 is communicated) by residing at the root node, rather than after the N:1 splitter 109. In this manner, only MoCA signals and a portion of the input signal 110 may be communicated over the on-premises wired network 100. As a result, there are reduced interference issues since a portion of the input signal 110 has been filtered out and the root node device 102 may coordinate the frequency of all signals being communicated over the cables 107. For example, a portion of the input signal 110 may comprise upstream cable television signals (e.g., from cable modems in other homes/offices connected to the HFC network in parallel with the device 102), and a portion of the input signal 110 may comprise downstream television signals. The Root Node 102 may filter out the upstream cable television signals and may convey the downstream cable television signals to the connector 152 (e.g., for servicing legacy televisions or other devices that do not support MoCA). This frees up the portion of the cable frequency band typically used for upstream signals to be utilized for MoCA signals and/or for other uses. Removing the upstream cable signals also reduces interference and the need for filtering such signals in the nodes 111A-111D.

Although FIG. 1A utilizes MoCA for illustration, aspects of the invention may be equally applicable to other premises-based network standards, such as, for example, the standards discussed below with respect to FIG. 2A.

Figure 1B:
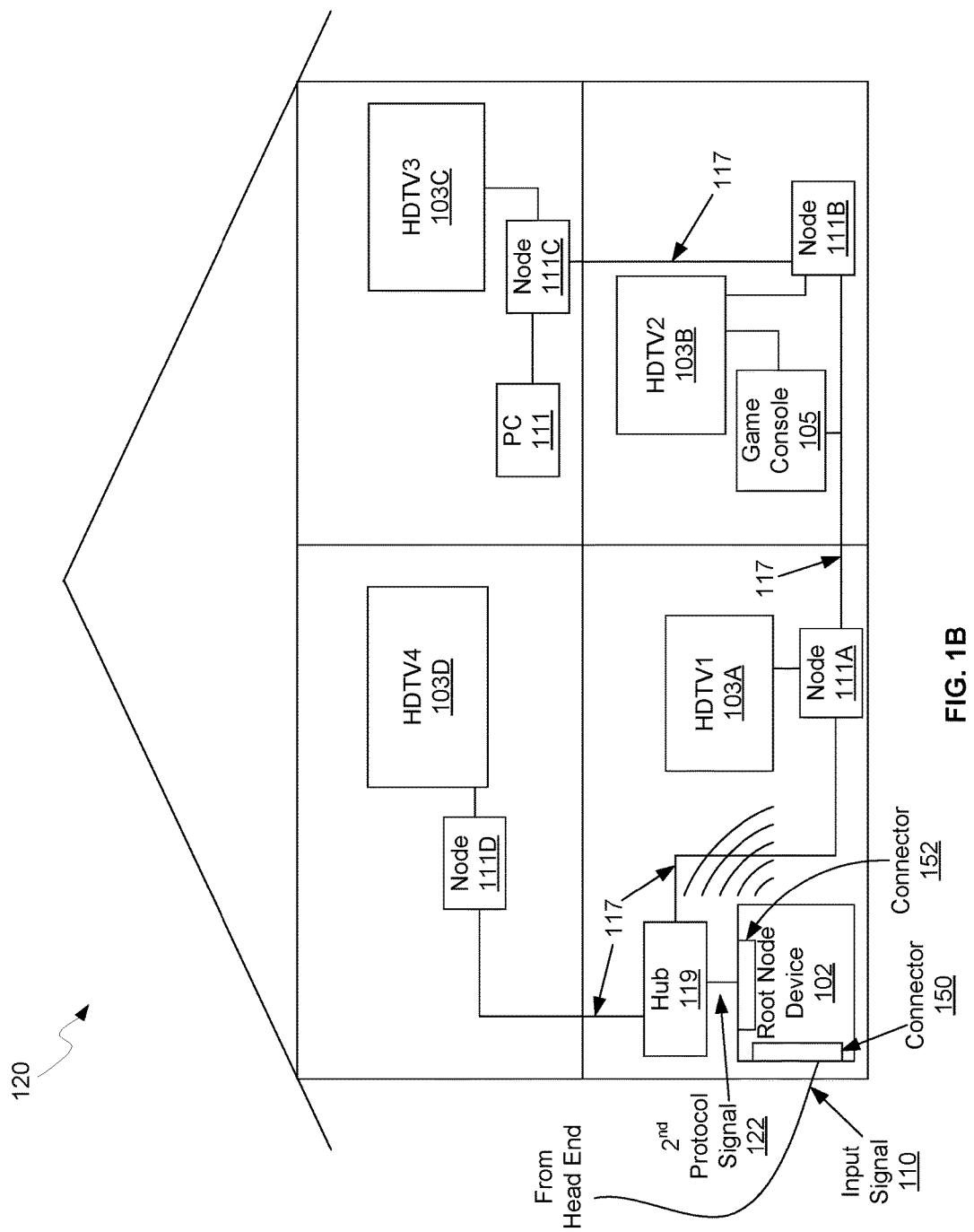
FIG. 1B is a diagram illustrating an example on-premises network, in accordance with an embodiment of the invention.

FIG. 1B is a diagram illustrating an example on-premises network, in accordance with an embodiment of the invention. Referring to FIG. 1B, there is shown an on-premises wired network 120 (e.g., in-home LAN, in-office LAN, etc.) spanning a plurality of rooms in the premises, where each one may have one or more networked devices. There is also shown node devices 111A-111D, the root node device 102, the high-definition televisions (HDTVs) 103A-103D, the game console 105, a hub 119, the personal computer 111, nodes 111A-111D, network lines 117, and an input signal 110. The input signal 110 may be provided by a cable head-end, a fiber-to-the-home service, digital subscriber line (DSL) service, or a satellite signal source, for example.

The wired network 120 is an alternative embodiment to the wired network 100 described with respect to FIG. 1A. Accordingly, the wired network 120 may comprise an Ethernet network, with the network lines 117 comprising Cat 5, 6, or 7 twisted pair cables, for example. Similarly, the hub 119 may comprise an Ethernet hub for providing a plurality of lines for the wired network 120 from a single input line carrying the second protocol signal 122.

The nodes 111A-111D may comprise Ethernet nodes for receiving Ethernet packets and bridging to appropriate signals for target devices. For example, the nodes 111A-111D may receive Ethernet packets, recover video and audio carried in the Ethernet packets, and generate corresponding video and audio signals to be communicated to the HDTV's 103A-103D.

In another example scenario, the wired network 120 may comprise a power line communications network where the network communications may be transmitted over existing power lines in the premises. Accordingly, the hub 119 may be an optional component in instances where the root node device 102 communicates to a plurality of devices, such as the nodes 111A-111D, over the power lines.

Figure 2A:
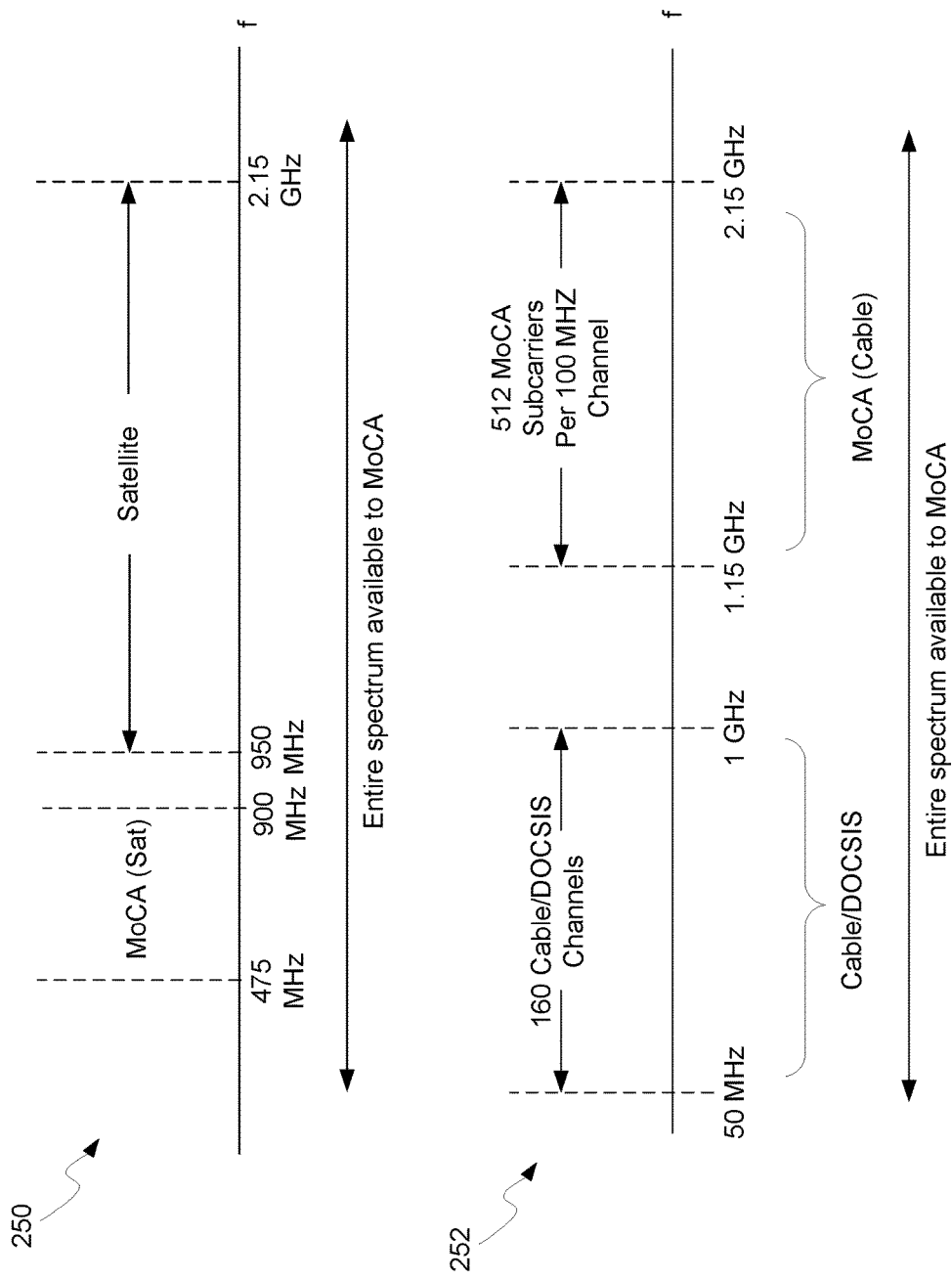
FIG. 2A is a diagram illustrating network frequency spectra, in accordance with an embodiment of the invention.

FIG. 2A is a diagram illustrating network frequency spectra, in accordance with an embodiment of the invention. Referring to FIG. 2A, there is shown a frequency spectrum 250 comprising a satellite TV band and a corresponding MoCA frequency band, and a spectrum 252 comprising a cable/DOCSIS frequency band and a corresponding MoCA frequency band. The cable and satellite frequency bands shown in FIG. 2A are only examples—the devices of the network 100 may be operable to handle different frequency ranges and/or configurable to handle multiple frequency ranges (e.g., configured to handle particular range(s) of frequencies based on the location in which the network 100 operates and/or based on the version of a networking standard that the network 100 is to be compatible with). For example, different versions of the DOCSIS standard may specify different upper limits for the DOCSIS upstream band, and devices of the network 100 may be configurable to handle various versions of the standard.

In a conventional on-premises network, the cable or satellite signal is communicated throughout the network, thereby requiring that that frequency band to be reserved for these cable or satellite signals. However, in an example embodiment of the invention, the service provider signal or signals (e.g., 110), may be received by a MoCA root node device, such as the root node device 102 described with respect to FIG. 1A, and converted to MoCA signals to be communicated over the on-premises wired network 100. The root node device 102 may therefore isolate signals communicated in accordance with one or more first communications protocols/standards (e.g., standards/protocols used external to the premises such as satellite, cable, DOCSIS, DSL, and/or the like) from signals communicated in accordance with one or more second communication protocols (e.g., MoCA, IEEE 802.3, and/or the like) on the network 100. Thus, the entire spectrum supported by the coaxial cables may be available to the second communication protocol(s) (e.g., MoCA) within the premises. For example, the root node device 102 may receive cable television signals in the 900 MHz range, encapsulate the data carried in the cable television signals in MoCA frames, and communicate the resulting MoCA signals in the ~500 MHz range. This may be done, for example, where the root node device 102 determines that frequencies in the ~500 MHz range are preferred (e.g., due to cable loss) over frequencies in the 1.15-2.15 GHz range (conventional range used for MoCA when coexisting with CATV/DOCSIS). Generally, selection of the frequency on which MoCA (or whatever standard/protocol is in use) signals are transmitted may be based, for example, on the quality of communications in a particular frequency range, which may be determined by a signal strength, a signal-to-noise ratio, bit error rate, cable length, cable quality, and/or the like.

In addition, the root node device 102 may enable more flexibility in MoCA devices within the premises. For example, if a premises previously had cable television service and the associated MoCA devices for cable television service, and the premises then switched to satellite television, the MoCA devices would normally not be able to function, since the MoCA bands for cable and satellite are different. However, the root node device 102 may enable the use of these MoCA devices no matter for which type of service provider signal they were intended.

Accordingly, the root node device 102 could receive the newly-subscribed satellite signals and communicate the resulting MoCA signals over the normal cable television MoCA channels supported by the existing MoCA devices, thereby enabling the user to continue to use their cable TV-specific MoCA devices despite currently being a satellite television subscriber. Since the root node device 102 may determine what frequency band is used within the on-premises wired network 100, the service provider communications protocol signals do not affect devices within the premises.

Figure 2B:
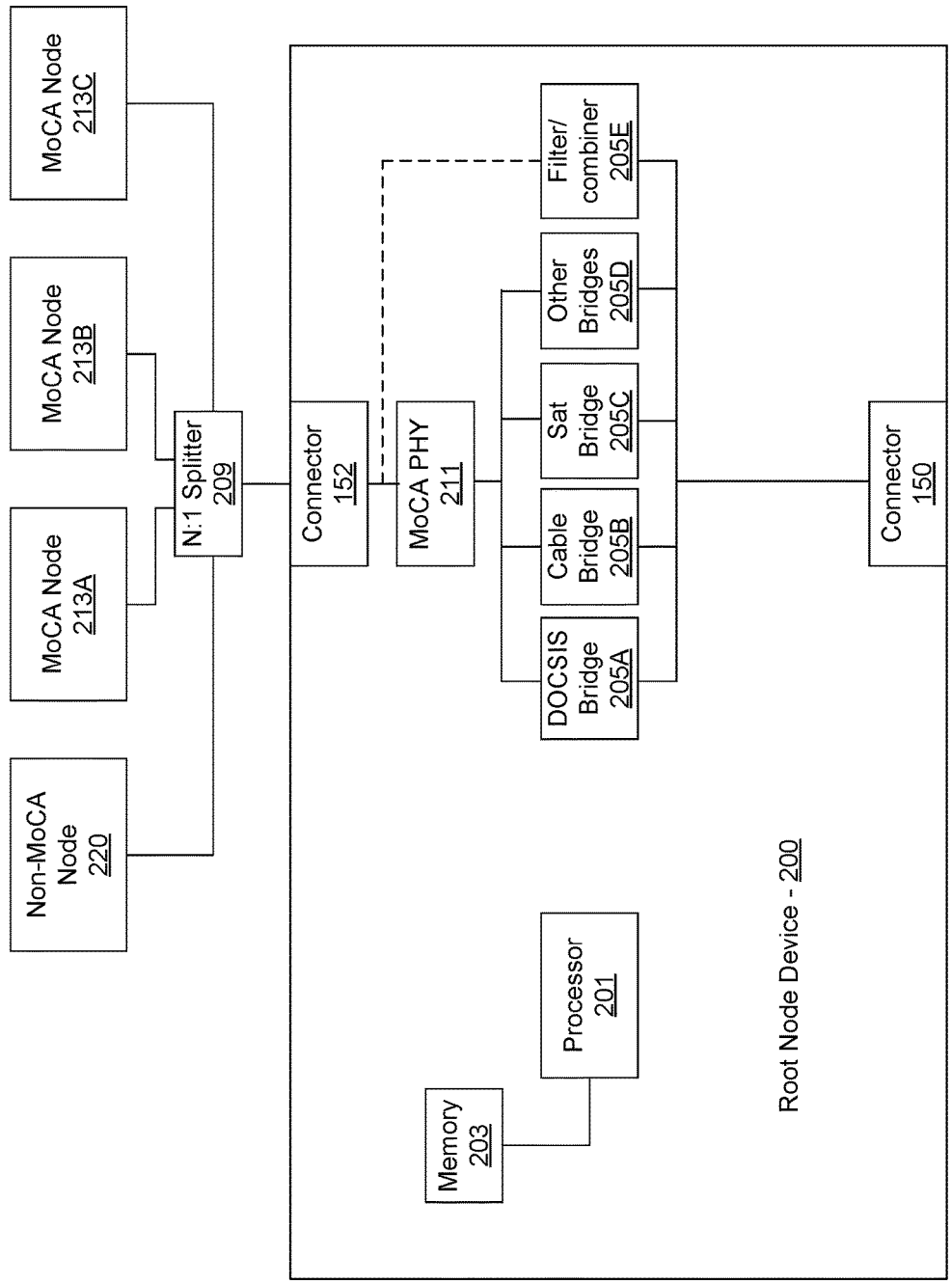
FIG. 2B is a diagram illustrating an example root node network controller, in accordance with an embodiment of the invention.

FIG. 2B is a diagram illustrating an example root node 200, in accordance with an embodiment of the invention. Referring to FIG. 2B, there is shown non-MoCA node 220, MoCA nodes 213A-213C, a N:1 splitter 209, and a root node device 200 comprising a processor 201, a memory 203, bridge modules 205A-205D, filter module 205E, connectors 150 and 152, and a MoCA PHY 211. The root node device 200 may, for example, share any or all characteristics with the root node device 102 discussed previously with regard to FIG. 1. The non-MoCA device may be, for example, a television or other device that is configured to receive CATV and/or DOCSIS signals and does not support MoCA. The devices 213A-213C may share any or all characteristics with the devices 101 discussed previously with regard to FIG. 1A. The root node device 200 may, for example, be integrated on a single semiconductor substrate (a system on chip (SOC)) or may comprise a plurality of components coupled by electrical and/or wireless connections.

The processor 201 may be operable to control the operation of the root node device 200. For example, the processor 201 may configure the bridge modules 205A-205D to receive various communications protocol signals and to generate output signals for packetization and further processing in the MoCA PHY 211, and/or may configure MoCA channels to be utilized by the MoCA PHY 211. In another embodiment of the invention, the processor 201 may be utilized to update and/or modify programmable parameters and/or values in modules of the device 200. At least a portion of the programmable parameters may be stored in the memory 203. In yet another embodiment, the processor 201 may implement any one or more of the bridge modules 205A-205D.

The bridge modules 205A-205D may comprise a DOCSIS bridge module 205A, cable television bridge module 205B, satellite television bridge module 205C, and other protocol bridge module 205D. In an example scenario, the other protocol bridge module 205D may be operable to receive optical signals from a fiber optic cable and convert them to electrical signals that may be communicated via the MoCA PHY 211. A bridge module may, for example, extract data and/or control information from packets received in accordance with a first protocol utilized external to a premises, and then load such information into packets in accordance with a second protocol for communication within the premises. Note that such repacketization may generally be bi-directional as needed.

In the downstream direction, the filter and combiner module 205E may be operable to filter out (i.e., remove) a portion of the signal received via connector 150 and convey the remaining portion(s) of the signal at connector 150 to the connector 152. As an example, the filter 205E may remove the cable upstream portion of the cable television signal (i.e., upstream signals from other devices in the HFC plant connected in-parallel with the device 200) received via connector 150 and may convey the remaining frequencies of the received cable television signal to the connector 152 (e.g., for passing downstream CATV/DOCSIS signals to the non-MoCA device 220). Bandwidth, attenuation, center frequency, quality factor, and/or other characteristics of the filter 205E may be programmable (e.g., configured by the processor 201.) In the upstream direction, the module 205E may be operable to filter out frequency bands being used for MoCA inside the network 100 and pass other frequency band(s) to the connection 150. For example, the module 205E may select and amplify legacy upstream CATV/DOCSIS signals from the non-MoCA device 220 to the connector 150.

The MoCA PHY 211 may be operable to communicate signals over coaxial cables, such as the cables 107, where the signals conform to the MoCA 1.x and/or 2.x standards, to one or more remote MoCA nodes, such as the MoCA nodes 213A-213C. In an example scenario, the MoCA PHY 211 may communicate MoCA signals outside of the conventional MoCA frequency ranges since more than the conventional MoCA frequency spectrum may be available, due to the root node device 200 isolating other protocol signals from the on-premises network.

The MoCA PHY 211 transmissions may be PHY frames scheduled in accordance with the Media Access Control (MAC) Layer specifications, and as such may comprise a PHY preamble and a PHY payload and may apply OFDM modulation. The root node device 200 may schedule and broadcast specific start and stop times at which transmissions from each node begin and end, and may be communicated in response to reservation requests. The MoCA PHY 211 may be operable to communicate MoCA signals in any frequency band as configured by the processor 201. In an example scenario, the MoCA PHY 211 may comprise a single transceiver that is operable to communicate over any frequency band that the cables 107 may support. In another example scenario, the MoCA PHY 211 may comprise a plurality of transceivers, each operable to communicate over a particular range of the frequency spectrum, such as the cable and satellite MoCA channels as shown in FIG. 2A.

The MoCA nodes 213A-213C may comprise MoCA devices, such as cable set top boxes with MoCA capability, for example, that may be controlled by the root node device 200. In an example scenario, the MoCA nodes 213A-213C may be operable to receive multimedia data via one or more MoCA channels, as configured by the root node device 200 and generate output video and audio signals to be displayed by an HDTV, for example.

In operation, the root node device 200 may direct network traffic to and from a particular device via the MoCA portion(s) of the spectrum and the portions of the spectrum corresponding to the frequency range of signals filtered out by the filter 205E. The root node device 200 may configure the communications links between all other network nodes within the on-premises wired network 100.

In an example scenario, upstream cable television signals and downstream cable television signals may be present at the input of connector 150. The passband of the filter 205E may be configured such that the cable downstream portion of the signal is passed to the connector 152 while the upstream portion is filtered out. In this manner, downstream cable television signals may be delivered to devices in the on-premises network that do not support MoCA. The bridge modules 205A-205D may convert the downstream cable television signals to MoCA signals such that downstream cable data may be communicated to devices that do support MoCA (e.g., the MoCA nodes 213A-213C). The bridge modules 205A-205D may similarly convert upstream MoCA signals received via the connector 152 to upstream cable television and output those cable television signals via the connector 150.

Figure 2C:
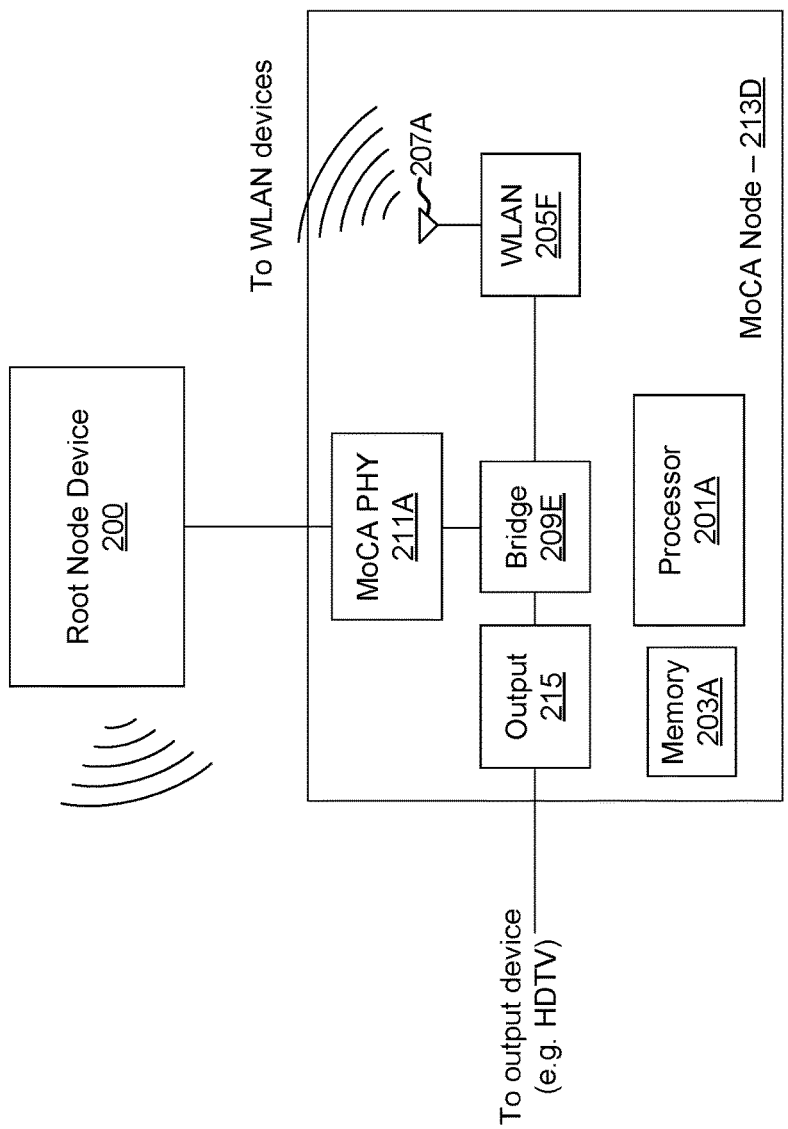
FIG. 2C is a diagram illustrating an example network device, in accordance with an embodiment of the invention.

FIG. 2C is a diagram illustrating an example network device, in accordance with an embodiment of the invention. Referring to FIG. 2C, there is shown a root node device 200 and a MoCA node 213D comprising a processor 201A, a memory 203A, a WLAN module 205F and a MoCA PHY 211A. The processor 201A, the memory 203A, and the MoCA PHY 211A may be substantially similar to the processor 201, the memory 203, and the MoCA PHY 211 described with respect to FIG. 2A, but located within the MoCA node 213D. The MoCA node 213D may, for example, share any or all characteristics with the MoCA Nodes 213A-213C discussed previously with regard to FIG. 2B.

The MoCA node 213D may comprise a networked device such as a MoCA bridge, a set-top box, a personal computer, or a gaming device, and may be controlled (at least in part) by the root node device 200. For example, the root node device 200 operating as a network controller may configure the channel frequency to be utilized in communication of data between the root node device 200 and the MoCA node 213D.

The root node device 200 may remove upstream cable television signals, thus easing filtering burdens on the MoCA node 213D and making additional spectrum available for MoCA communications between the root node 200 and the node 213D.

Figure 2D:
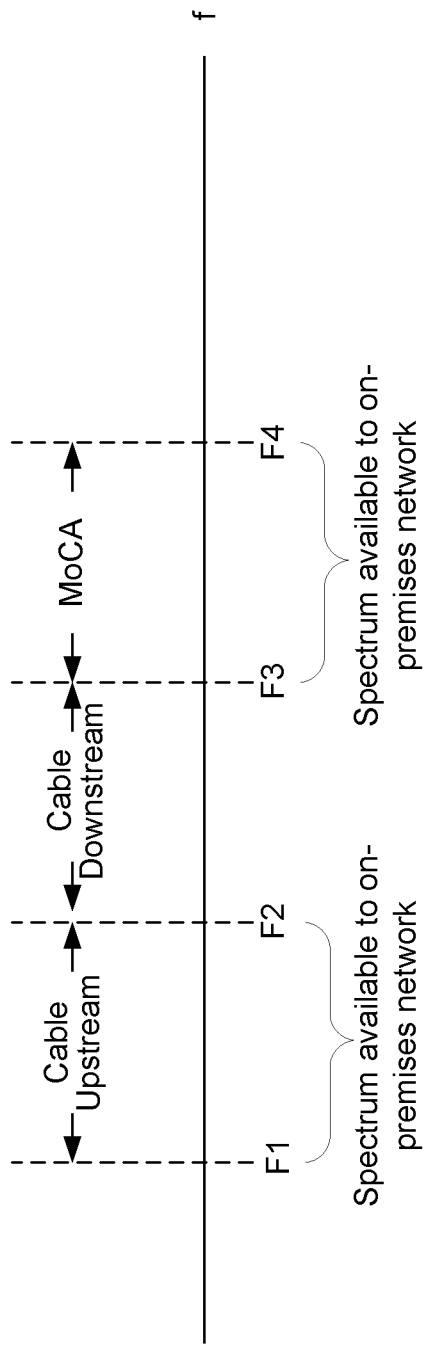
FIG. 2D is a diagram illustrating network frequency spectra, in accordance with an embodiment of the invention.

FIG. 2D is a diagram illustrating network frequency spectra, in accordance with an embodiment of the invention. Referring to FIG. 2D, there is shown a cable/DOCSIS frequency band and its associated MoCA frequency band. Frequency bands used for describing FIG. 2D are only examples-the devices of the network 100 may be operable to handle different frequency ranges and/or configurable to handle multiple frequency ranges (e.g., configured to handle particular range(s) of frequencies based on the location in which the network 100 operates and/or based on the version of a networking standard that the network 100 is to be compatible with). For example, different versions of the DOCSIS standard may specify different upper limits for the DOCSIS upstream band, and devices of the network 100 may be configurable to handle various versions of the standard.

In a conventional on-premises network, the cable signal is communicated throughout the network, thereby reserving cable upstream (frequency band F1 to F2 in FIG. 2D, where F1 is, for example, ~5 MHz and F2 is, for example, ~42 MHz) and MoCA frequency bands (frequency band F3 to F4 is, in FIG. 2D where F3 is, for example ~50 MHz and F4 is, for example, ~1 GHz) for these communications. However, in an example embodiment of the invention, the upstream cable television signals may be filtered out at the root node, thus freeing up the cable upstream portion (frequency band F1 to F2 in FIG. 2D) of the spectrum for MoCA (or some other premises-based standard) signals.

Figure 2E:
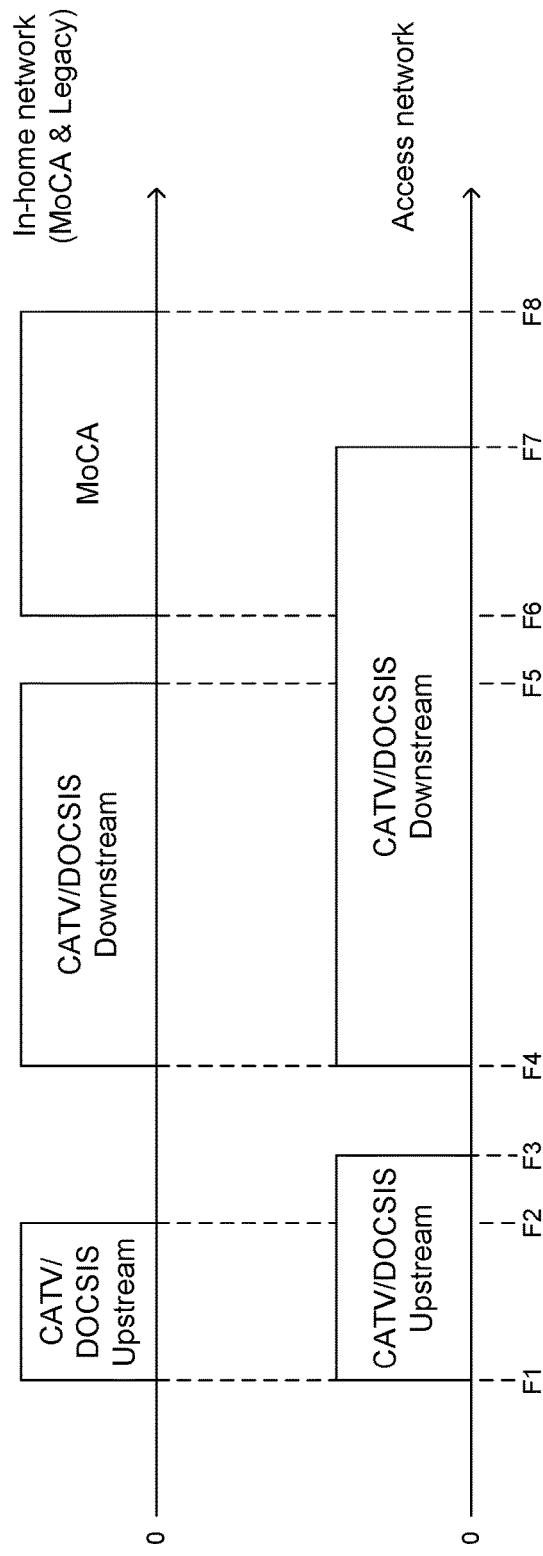
FIG. 2E is a diagram illustrating example frequency spectra on either side of the root node device 200.

FIG. 2E is a diagram illustrating example frequency spectra on either side of the root node device 200. The spectra in FIG. 2E may correspond to an instance of the network 100 in which one or more non-MoCA devices 220 are present.

The legacy cable/DOCSIS devices 220 in the network 100 may use only the F1 to F2 (e.g., 5-42 MHz) for upstream signals. In the access network, however, the cable/DOCSIS upstream goes up to higher frequency F3 (e.g., 50 MHz in accordance with a later version of the DOCSIS standard). Accordingly, by isolating the access network and the in-home/business network, node 200 may enable frequencies F2 to F3 to be unused in the network 100 and/or reallocated to use for MoCA signals.

The legacy cable/DOCSIS devices 220 in the network 100 may use only the F4 to F5 (F4 being greater than F3) for cable/DOCSIS downstream signals. In the access network, however, the cable/DOCSIS downstream goes up to higher frequency F7 (e.g., in accordance with a later version of the DOCSIS standard). Accordingly, by isolating the access network and the in-home/business network, node 200 may enable frequencies F5 to F7 to be unused in the network 100 and/or reallocated to use for MoCA signals.

Figure 3:
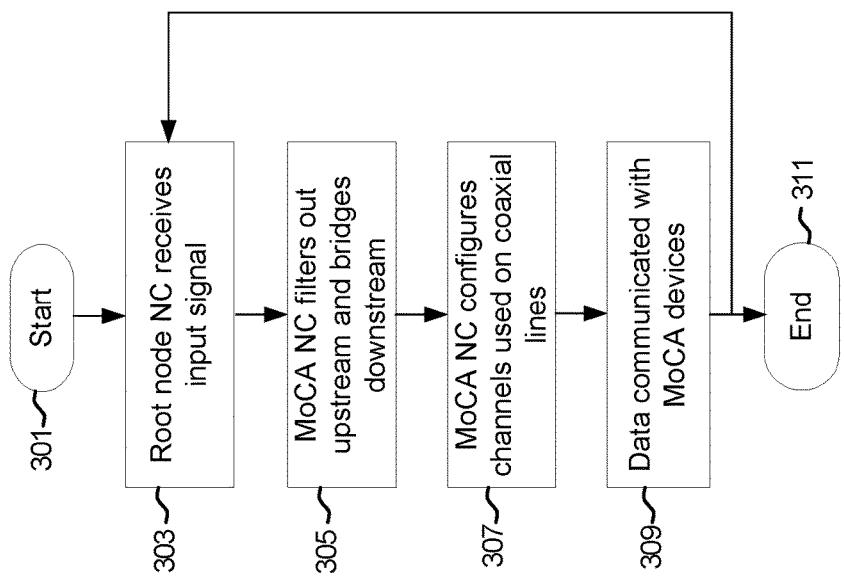
FIG. 3 is a flowchart illustrating an example process for providing an on-premises network, in accordance with an embodiment of the invention.

FIG. 3 is a flowchart illustrating an example process for providing an on-premises network, in accordance with an embodiment of the invention. The example method illustrated in FIG. 3 may, for example, share any or all functional aspects discussed previously with regard to FIGS. 1A-2C. Referring to FIG. 3, after start step 301, in step 303, the root node 200 operating as a network controller (NC) may receive input signals from an external source such as a cable head end, for example. The signal from the head end may comprise upstream and downstream cable TV signals.

In step 305, the root node device 200 may filter out the upstream cable television signals. As for the downstream cable television signals, the root node device 200 may output them for use by legacy televisions and may bridge them to MoCA signals for use by MoCA-enabled end systems. In an example implementation, the root node 200 may be configurable such that the portion of the cable/DOCSIS spectrum passed from the external network to the on-premises network may be configured based on the devices present in the particular premises in which the root node 200 is installed. For example, if all devices of the on-premises are MoCA-enabled, the root node 200 may be configured to isolated connectors 150 and 152 across the whole cable spectrum, whereas, in the presence of a cable device that does not support MoCA, the node 200 may be configured to pass the downstream portion of the cable spectrum from connector 150 to connector 152.

In step 307, the root node device 200 may configure the channel over which the MoCA signals are to be communicated via the coaxial cables 107. For example, the root node device 200 may configure MoCA signals to be communicated over a frequency range conventionally reserved for MoCA signals in a cable television system and/or over the frequency range conventionally reserved for upstream cable television signals (e.g., ~5 to ~42 MHz).

In step 309, the MoCA data may be communicated to the receiving MoCA devices 213A-213D, followed by end step, or the process may loop back to step 303 if further communications are to occur.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform processes as described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out processes described herein.

One embodiment of the present invention may be implemented as a board level product, as a single chip, application specific integrated circuit (ASIC), or with varying levels integrated on a single chip with other portions of the system as separate components. The degree of integration of the system may primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system comprising:
a network device comprising:
   a first connector for connecting to an external network from which data is communicated using a first frequency band f1 to f2 in accordance with a first communications protocol;
   a second connector for connecting to an on-premises network; and
   circuitry residing in a signal path between said first connector and said second connector, said circuitry being operable to:
      permit a first portion of said first frequency band f1 to f2 to pass from said first connector to said second connector;
      block a second portion of said first frequency band f1 to f2 from passing from said first connector to said second connector; and
      communicate, via said second connector, signals that are normally communicated in a frequency range f3 to f4 which does not include said first frequency band f1 to f2, into said on-premises network using said first frequency band f1 to f2.

2. The system of claim 1 wherein said signals comprise packets formatted in accordance with Multimedia over Coax Alliance (MoCA) standards.

3. The system of claim 1, wherein said first portion of said first frequency band spans from 5 megahertz (MHz) to 42 MHz.

4. The system of claim 1, wherein said circuitry is operable to:
   receive downstream signals via said first connector;
   recover data from said downstream signals;
   encapsulate said data into one or more packets according to a second communications protocol used in said on-premises network; and
   transmit said one or more packets into said on-premises network via said second connector.

5. The system of claim 4, wherein said one or more packets are multimedia over coax alliance (MoCA) packets.

6. The system of claim 1, wherein said circuitry is operable to:
   receive upstream signals via said second connector;
   recover data from said upstream signals;
   encapsulate said data into one or more packets according to a protocol used in said external network; and
   transmit said one or more packets into said external network via said second connector.

7. A system comprising:
a network device comprising:
   a first connector for connecting to an external network in which upstream signals are communicated in accordance with a first communications protocol using a first frequency band f1 to f2 and one or both of first and second downstream signals are communicated using a second frequency band f3 to f4;
   a second connector for connecting to an on-premises network; and
   circuitry residing in a signal path between said first connector and said second connector, said circuitry being operable to:
      permit said one or both of said first and second downstream signals to pass from said first connector to said second connector;
      block said upstream signals communicated in accordance with a first communications protocol from passing from said first connector to said second connector; and
      communicate, via said second connector, said one or both of first and second downstream signals that are normally communicated in a frequency range f3 to f4 which does not include said first frequency band f1 to f2, into said on-premises network using said first frequency band f1 to f2.

8. The system of claim 7, wherein said signals comprise packets formatted in accordance with Multimedia over Coax Alliance (MoCA) standards.

9. The system of claim 7, wherein said signals are also communicated in a frequency range above 1 GHz.

10. The system of claim 7, wherein said circuitry is operable to:
   receive said downstream signals via said first connector;
   recover data from said downstream signals;
   encapsulate said data into one or more packets according to a protocol used in said on-premises network; and
   transmit said one or more packets into said on-premises network via said second connector.

11. The system of claim 10, wherein said one or more packets are multimedia over coax alliance (MoCA) packets.

12. The system of claim 7, wherein said circuitry is operable to:
   receive second upstream signals via said second connector;
   recover data from said second upstream signals;
   encapsulate said data into one or more packets according to a protocol used in said external network; and
   transmit said one or more packets into said external network via said first connector.

13. The system of claim 7, wherein said network device is positioned furthest upstream of all devices of said on-premises network.

14. A method comprising:
   in a network device comprising a first connector for connecting to an external network in which upstream signals communicated in accordance with a first communications protocol are communicated using a first frequency band f1 to f2 and one or both of first and second downstream signals are communicated using a second frequency band f3 to f4, and comprising a second connector for connecting to an on-premises network:
  permitting said one or both of said first and second downstream signals communicated in accordance with said first communications protocol to pass from said first connector to said second connector;
  blocking said upstream signals communicated in accordance with a first communications protocol from passing from said first connector to said second connector; and
  communicate, via said second connector, said one or both of first and second downstream signals that are normally communicated in said frequency band f3 to f4 which does not include said first frequency band f1 to f2, into said on-premises network using said first frequency band f1 to f2.

15. The method of claim 14, wherein said signals comprise packets formatted in accordance with Multimedia over Coax Alliance (MoCA) standards.

16. The method of claim 14, wherein said signals are also communicated in a frequency range above 1 GHz.

17. The method of claim 14, comprising:
  receiving said downstream signals via said first connector;
  recovering data from said downstream signals;
  encapsulating said data into one or more packets according to a protocol used in said on-premises network; and
  transmitting said one or more packets into said on-premises network via said second connector.

18. The method of claim 17, wherein said one or more packets are multimedia over coax alliance (MoCA) packets.

19. The method of claim 14, wherein said circuitry is operable to:
  receive second upstream signals via said second connector;
  recover data from said second upstream signals;
  encapsulate said data into one or more packets according to a protocol used in said external network; and
  transmit said one or more packets into said external network via said second connector.

20. The method of claim 14, wherein said network device is positioned furthest upstream of all devices of said on-premises network.

* * * * *